United States Patent [19]

Daitoku et al.

[11] Patent Number: 4,576,460
[45] Date of Patent: Mar. 18, 1986

[54] PHOTOGRAPHING LENS POSITION DEVICE IN AUTOMATIC FOCUSING CAMERA

[75] Inventors: Koichi Daitoku; Daiki Tsukahara, both of Kanagawa, Japan

[73] Assignee: Nippon Kogaku K. K., Tokyo, Japan

[21] Appl. No.: 665,397

[22] Filed: Oct. 26, 1984

[30] Foreign Application Priority Data

Oct. 28, 1983 [JP] Japan ............................ 58-167132[U]

[51] Int. Cl.⁴ .............................................. G03B 3/10
[52] U.S. Cl. .................................. 354/400; 354/195.1
[58] Field of Search ............... 354/400, 401, 402, 403, 354/195.1

[56] References Cited

U.S. PATENT DOCUMENTS 4,206,990  6/1980  Imura et al. ...................... 354/195.1
4,274,720  6/1981  Tsujimoto ........................... 354/402

Primary Examiner—Russell E. Adams
Attorney, Agent, or Firm—Finnegan, Henderson, Farabow, Garrett & Dunner

[57] ABSTRACT

A device for positioning a photographing lens to focus the lens on an object is disclosed. The device comprises distance detecting means for detecting a distance to an object to provide an output signal, the distance detector detecting the distance when the object is positioned in the range of ordinary photographing distances and in the range of distances shorter than the ordinary photographing distances, a position determining system for determining the position of the photographing lens in the direction of the optical axis according to the output signal, and a drive system for responding to an output of the position determining system. The drive system includes a cam which is displaced to move the photographing lens along the optical axis. The cam has a first displacement region for operating the photographing lens when the object is in the range of ordinary photographing distances, and a second displacement region for operating the photographing lens when the object is in the range of distances shorter than the ordinary photographing distances. The first and second displacement regions are so shaped that, with respect to an amount of displacement of the cam, the amount of movement of the photographing lens with the first displacement region is larger than that with the second displacement region.

5 Claims, 2 Drawing Figures

PHOTOGRAPHING LENS POSITION DEVICE IN AUTOMATIC FOCUSING CAMERA

BACKGROUND OF THE INVENTION

1. Field of the Invention

This invention relates to the automatic focusing operation of a camera, and more particularly to a device for determining the focusing position of the photographing lens.

2. Description of the Prior Art

In the case where, in order to perform macro-photography with an automatic focusing camera, the photographing lens is continuously focused on the object by extending it to a closest focusing distance of the order of 0.4 m beyond the range of ordinary photographing distances of from infinity to about 0.8 m, the photographing lens is displaced to the closest focusing distance from infinity. That is, the amount of movement of the photographing lens is large. Accordingly, a device for detecting the amount of movement of the photographing lens and a device for limiting the displacement of photographing lens are intricate, and the drive mechanism is also complicated. Furthermore, as it takes a relatively long time to displace the photographing lens, the time interval which elapses from the time instant that the shutter is released until the shutter is actually opened is also relatively long, which makes it difficult to perform the photographing operation.

Furthermore, a method of moving a close-up lens in front of the photographing operation with an automatic function auxiliarily used may be employed. However, in this case, the construction of the camera becomes intricate. Therefore, employment of the method is not practical.

On the other hand, there has been a demand for realization of the technique that, where it is required to take a picture of an object at a distance shorter than the close-up photographing distance limit, e.g., 0.8 m, in the range of ordinary photographing distances, the photographing lens can be focused on the object without using high photographing technique, i.e., by changing the close-up photographing distance limit directly (skipping over the intermediate distance) to a closest focusing distance of about 0.4 m for instance at the sacrifice of continuity.

SUMMARY OF THE INVENTION

In view of the foregoing, an object of this invention is to provide an automatic focusing camera simple in construction which can perform a macro-photographing operation.

In order to achieve the foregoing object and other objects of the invention, the automatic focusing camera of the invention comprises: a positioning member for determining the position of the photographing lens in the direction of the optical axis; and a cam member which operates in association with the photographing start operation, to cause its cam part to displace the positioning member, the cam member having a slow speed cam part for displacing the positioning member when the object is positioned in the range of ordinary photographing distances, and a high speed cam part for displacing the positioning member when the object is at the closest focusing distance beyond the range of ordinary photographing distances, the slow speed cam part and high speed cam part being so shaped that, with respect to an amount of displacement of the cam member, the amount of displacement of the positioning member with the high speed cam part is larger than that with the slow speed cam part. The ordinary photographing operation is carried out with the slow speed cam part of the cam member, and the macro-photographing operation is performed with the high speed cam part so that the photographing lens is placed in the macro-photographing state being moved quickly.

DETAILED DESCRIPTION OF THE PREFERRED EMBODIMENT

Figures 1, 2:
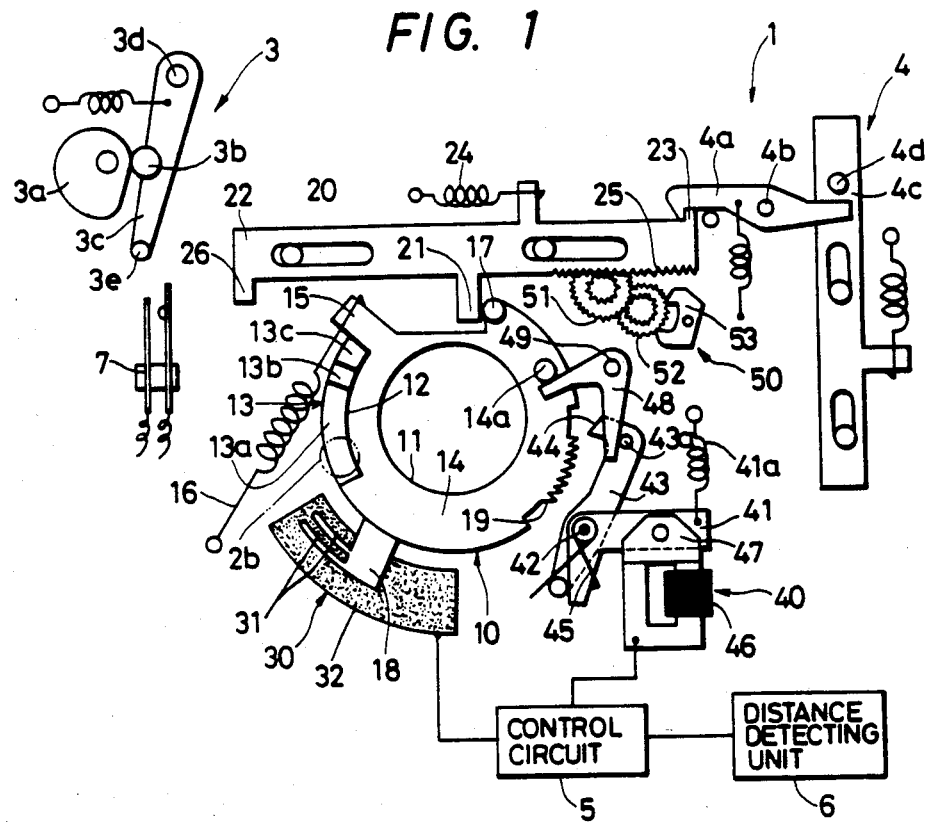
FIG. 1 is a front view showing the essential components of a photographing lens positioning device in an automatic focusing camera according to the invention.
FIG. 2 is a side view thereof.

A photographing lens positioning device 1 in an automatic focusing camera according to the invention, as shown in FIGS. 1 and 2, comprises: a rotary cam member 10 rotatably supported on a camera housing (not shown), for pushing a photographing lens 2; a slider 20 engaged with the cam member 10 to turn the latter; a displacement detecting member 30; a displacement limiting member 40; and a governor mechanism 50.

The rotary cam member 10 is positioned behind the photographing lens 2. The cam member 10 has a through-hole at the center which defines the optical path of an incident beam from the photographing lens 2; i.e., the cam member 10 has an arcuate cam wall 12 outside the optical path. The top surface of the cam wall 12 forms a cam portion 13 whose height is gradually changed in the direction of displacement of the photographing lens 2. A locking arm 15 is extended from a control plate 14 in such a manner that it spreads radially of the base of the cam wall 12. A spring 16 is connected to the locking arm 15 so as to urge the rotary cam member 10 to turn counterclockwise.

The cam portion 13, as shown in FIG. 2, is slidably in contact with a transmission pin 2b extended from the rear end surface of the lens barrel 2a of the photographing lens 2. The cam portion 13 consists of a slow speed cam part 13a for the ordinary photographing operation, a high speed cam part 13b for greatly displacing the photographing lens 2 with a small amount of rotation of the cam member 10, to place the lens in macro-photographic state, and a flat part 13c for holding the macro-photographic state. The lens barrel 2a is urged towards the cam portion 13 by suitable means (not shown).

The slider 20 is supported by the camera housing in such a manner that it is slidable in parallel with the tangent to the circle which is formed when the cam member 10 turns. A locking pin 17 is embedded in the control plate 14 of the cam member 10. A protrusion 21 is extended from the middle portion of the slider in such a manner that the protrusion 21 is engaged with the locking pin 17 only in the direction of depression. One end portion of the slider is formed into an engaging portion 22, and the other end portion is formed into a locking portion 23. The slider is urged to the left (in FIG. 1) by a spring 24.

A cam mechanism 3 is provided adjacent to the engaging portion 22 of the slider 20. The cam mechanism 3 operates when a film winding mechanism (not shown) is operated. the cam mechanism 3 comprises: a cam 3a; a cam follower 3b which rocks as the cam 3a turns; a charge lever 3c; and a pin 3e. The cam follower is extended from the middle portion of the charge lever 3c, and the pin 3e is embedded in the end portion of the lever 3c. The lever 3c is pivotally mounted on a shaft 3d, and the pin 3e can be pushed against the engaging portion 22 of the slider.

A release member 4 is provided adjacent to the locking portion 23 of the slider 20. The release member 4 has a locking hook 4a which is pivotally mounted on a shaft 4b secured to the camera housing, in such a manner that the hook 4a is engaged with and disengaged from the locking end portion 23 of the slider. The release member 4 has a lever 4c which is provided with a pin 4d adapted to disengage the hook 4a from the locking portion 23.

The displacement detecting member 30 comprises: a contact 31 connected to a detecting piece 18 which is extended from the rotary cam member 10; and a signal generating board 32 which is shaped arcuate according to the locus of the contact 31. The board 32 generates a displacement signal representing an amount of displacement which is detected by the contact.

The displacement limiting member 40 has a locking lever 43 which is pivotally mounted on the pin 42 of a control lever 41. One end portion of the locking lever 43 is formed into a locking pawl 44 which is moved into engagement with and disengagement from a tooth of the arcuate teeth 19 which are formed in a part of the periphery of the cam member 10. The locking lever 43 and the control lever 41 are coupled together by a spring 45 connected therebetween. An armature 47 is fixedly secured to the control lever 41 in such a manner that it is attracted by an electromagnet 46. A spring 41a is connected to the control lever 41 so that the armature 47 is urged to disengage from the magnet 46 and the locking pawl 44 is urged to engage with a tooth of the arcuate teeth 19.

The magnet 46 is so connected to a camera control circuit 5 that the amount of rotation of the control plate 14 and the cam member 10 is controlled according to a photographing distance. The control circuit 5 is provided with a distance detecting unit 6 to obtain a distance detection signal.

A pin 43a is embedded in the other end portion of the locking lever 43. A lever 48 is pivotally supported by the camera body, in such a manner that its one end portion is turned by a pin 14a embedded in the control plate 14 when the slider 20 is charged to make the cam member 10 ready for start. On the other hand, the other end portion of the lever 48 is so positioned as to push the pin 43a of the locking lever 43 to maintain the latter disengaged from the arcuate teeth part 19.

The governor mechanism 50 comprises: a gear train 51 engaged with a rack 25 of the slider 20; and an anchor 53 engaged with an escapement wheel 52 coupled to the gear train 51.

A protrusion 26 is extended from the end of the engaging portion of the slider 20. A switch 7 is provided on the prolongation of the locus of the protrusion 26 in such a manner that it is operated by the protrusion 26.

The device thus constructed operates as follows:

FIG. 1 shows a state of the device in which the slider 20 is moved to the start position against the elastic force of the spring 24 by operating the cam mechanism 3 so that the locking portion 23 is engaged with the hook 4a of the release member 4, i.e., the slider 20 is energized.

When the release button (not shown) is depressed, the lever 4c is moved downwardly in FIG. 1. Accordingly, the hook 4a is operated by the pin 4d of the lever 4c, thus releasing the locking portion 23. As a result, the slider 20 energized by the spring 24 is moved to the left in FIG. 1. In this operation, the rack 25 engages with the gear train 51 of the governor mechanism 50, and the slider is moved at a constant speed with the aid of the anchor 53 engaged with the escapement wheel 52 of the gear train 51.

As the slider is moved as described above, the protrusion 21 locking the pin 17 is moved so that the cam member 10 is turned counterclockwise (in FIG. 1) by the elastic force of the spring 16. As a result, the cam portion 13 pushes the transmission pin 2b forwardly, thereby to extend the photographing lens 2 forwardly.

In the ordinary photographing state, the transmission pin 2b is in contact with the slow speed cam part 13a which is a gentle slope. Therefore, the speed of extension is low, and accordingly the lens can be correctly focused on the object.

As the rotary cam member 10 is turned as described above, the contact 31 is also turned, so that the displacement signal is produced according to the movement of the contact relative to the signal generating board 32. The displacement signal is applied to the control circuit 5, where it is compared with the displacement detection signal from the distance detecting unit 6. According to the result of comparison, the control circuit 5 controls the displacement limiting member 40.

That is, when the distance to the object represented by the displacement signal coincides with the distance to the object represented by the distance detection signal, the attracting of the control lever 41 by the magnet 46 is released, and the locking pawl 44 is engaged with one of the arcuate teeth 19 of the cam member 10, thus stopping the rotation of the cam member 10. Thus, the extension of the photographing lens is stopped, and the latter is focused on the object.

In the ordinary photographing operation, the lens is focused on the object in the above-described manner. In the case of the macro-photographing operation, the transmission pin 2b is brought into contact with the high speed cam part 13b so that the photographing lens 2 is quickly extended, and then the pin 2b is brought into contact with the flat part 13c so that the macro-photographing state is maintained. Under this macro-photographing condition, the amount of displacement of the photographing lens 2 is constant irrespective of the angle of rotation of the cam member 10, for instance the macro-photographing operation being possible only with 0.4 m.

In this case, the cam member 10 is locked with the locking pawl 44 engaged with one of the arcuate teeth 19. For this purpose, the energization of the magnet 46 is controlled by the distance detection signal provided by the distance detecting unit 6 which has detected the fact that the object is at a macro-photographing distance which is shorter than the closest focusing distance in the ordinary photographing operation. The cam member 10 may be locked by a rotation regulating member (not shown) with the control lever 41 attracted by the magnet.

After the cam member 10 has been stopped, the slider 20 is further moved to push the switch 7, as a result of which the shutter is released. Thus, the photographing operation has been achieved.

When the film is wound for the next photographing operation, the cam mechanism 3 is operated; i.e., the charge lever 3c is turned by the cam 3a so that the pin 3e pushes the engaging portion 22 of the slider 20 to move the latter to the right in FIG. 1. As a result, the locking portion 23 is locked to the hook 4a, and the slider 20 is held at the start position being energized.

At the same time, the cam member 10, being pushed by the protrusion 21 of the slider, is returned to its original position, and the photographing lens 2 is also returned to its original position.

The ordinary photographing operation is carried out according to the above-described operating cycle.

Instead of the flat part 13c for macro-photography a sloped surface may be employed so that, in the macro-photographing operation also, the lens is focused on the object with the distance measured.

In the above-described embodiment, the photographing lens is extended so that the ordinary photographing state is changed into the macro-photographing state; however, it may be retracted so that the macro-photographing state is changed into the ordinary photographing state. Furthermore, in the above-described embodiment, the cam members are of rotation type; however, it goes without saying that they may be replaced by cam member of straight movement type.

We claim:

1. A device for positioning a photographing lens to focus said lens on an object, which comprises:

distance detecting means for detecting a distance to an object to provide an output signal, said distance detecting means detecting said distance when said object is positioned in the range of ordinary photographing distances and in the range of distances shorter than said ordinary photographing distances;

position determining means for determining the position of said photographing lens in the direction of the optical axis according to said output signal; and drive means for responding to (an output of) said position determining means, said drive means including cam mans which is displaced to move said photographing lens along the optical axis, said cam means having a first displacement region for operating said photographing lens when said object is in the range of ordinary photographing distances, and a second displacement region for operating said photographing lens when said object is in the range of distances shorter than said ordinary photographing distances, said first and second displacement regions being so shaped that, with respect to an amount of displacement of said cam means the amount of movement of said photographing lens with said second displacement region is larger than that with said first displacement region.

2. A device as claimed in claim 1, in which said cam means includes first and second cam surfaces which merge with each other and which form said first and second displacement regions, respectively.

3. A device as claimed in claim 2, in which said cam means includes a flat surface which merges with said second cam surface, on one side thereof which is opposite to the side where said first cam surface is provided, with said flat surface said photographing lens being held stopped irrespective of displacement of said cam means.

4. A device as claimed in claim 1, in which an amount of movement of said photographing lens provided by said first displacement region corresponds to said output signal of said distance detecting means, and an amount of movement of said photographing lens provided by said second displacement region is independent of said output signal.

5. A device for positioning a photographing lens to focus said lens on an object, which comprises:

distance detecting means for detecting a distance to an object to provide an output signal, said distance detecting means detecting said distance when said object is positioned in the range of distances shorter than said ordinary photographying distances; and drive means for responding to said output signal, said drive means including cam means which is displaced to move said photographying lens along the optical axis, said cam means having a first displacement region for operating said photographing lens when said object is in the range of ordinary photographying distances, and a second displacement region for operation said photographing lens to a predetermined position on the optical axis when said object is in the range of distances shorter than said ordinary photographing distances, said first and second displacement regions being so shaped that, with respect to an amount of displacement of said cam means the amount of movement of said photographing lens with said second displacement region is larger than that with said first displacement region.

* * * * *